United States Patent [19]

Chou

[11] Patent Number: 5,020,112
[45] Date of Patent: May 28, 1991

[54] IMAGE RECOGNITION METHOD USING TWO-DIMENSIONAL STOCHASTIC GRAMMARS

[75] Inventor: Philip A. Chou, Chatham, N.J.

[73] Assignee: At&T Bell Laboratories, Murray Hill, N.J.

[21] Appl. No.: 429,923

[22] Filed: Oct. 31, 1989

[51] Int. Cl.$^5$ .............................................. G06K 9/62
[52] U.S. Cl. ......................................... 382/37; 382/39
[58] Field of Search ............................. 382/37, 39, 30

[56] References Cited

U.S. PATENT DOCUMENTS

| | | | |
|---|---|---|---|
| 4,556,985 | 12/1985 | Honge | 382/30 |
| 4,661,924 | 4/1987 | Okamoto | 364/419 |
| 4,754,489 | 6/1988 | Bokser | 382/37 |

OTHER PUBLICATIONS

Introduction to Automata Theory, Languages, and Computation, by Hopcroft and Ullman; Addison-Wesley, 1979.

Semantics of Contest-Free Languages by Knuth; Journal of Mathematical System Theory; vol. 2, pp. 127-148, 1968.

Syntactic Pattern Recognition and Application, K. S. Fu; Prentice-Hall; Chapter 4, pp. 131-161.

The Dragon System; IEEE Transactions on Acoustic Speech and Signal Processing, by J. K. Baker, ASSP 23:24-29; 1975.

Stochastic Modeling as a Means of Automatic Speech Recognition, J. K. Baker, PhD Thesis; Carnegie-Mellon University, 1975.

Trainable Grammars for Speech Recognition, a paper by J. K. Baker.

Syntactic Pattern Recognition Applications, R. S. Fu, editor Chapter 5; pp. 95-123 and Chapter 7; pp. 147-177; Springer-Verlag, 1977.

*Primary Examiner*—Michael Razavi
*Assistant Examiner*—David Fox
*Attorney, Agent, or Firm*—J. W. Herndon

[57] ABSTRACT

A method of automatically identifying bitmapped image objects. Each of a set of templates in an object template library is compared with all areas of like size of a bitmapped image. A set of signals is generated for each such comparison that satisfies a defined matching criteria between the template and the image area being compared. The set of signals identifies the object based on the matching template, the location of the object in the image and an indication of the goodness of the match between the object and the template. A series of possible parse trees are formed that describe the image with a probability of occurrence for each tree. Each parent node and its child nodes of each parse tree satisfies a grammatical production rule in which some of the production rules define spatial relationships between objects in the image. The one of the possible parse trees which has the largest probability of occurence is selected for further utilization.

7 Claims, 8 Drawing Sheets

CUMULATION DISTRIBUTION FILE

C = NO. OF BLACK PIXELS IN THE SHADED REGION

\# BLACK PIXELS IN A BOUNDING BOX
= cdf (LOWER RIGHT CORNER)
- cdf (LOWER LEFT CORNER)
- cdf (UPPER RIGHT CORNER)
+ cdf (UPPER LEFT CORNER)

FIG. 11
PHRASELIST
| | E | PROB | RULE | = | — | — | — | m | c | 2 |
|---|---|---|---|---|---|---|---|---|---|---|
| 1 | | | | 1102 | 1104 | 1106 | 1108 | 1110 | 1112 | 1114 |
| 2 | E = | | | E— | E— | =m | mc | c² | | |
| 3 | E = m | | | =mc | mc² | | | | | |
| 4 | E = mc | | | =mc | | | | | | |
| 5 | E = mc² | | | | | | | | | |
FIG. 12
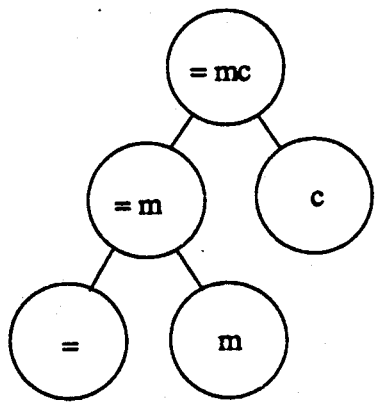
FIG. 13
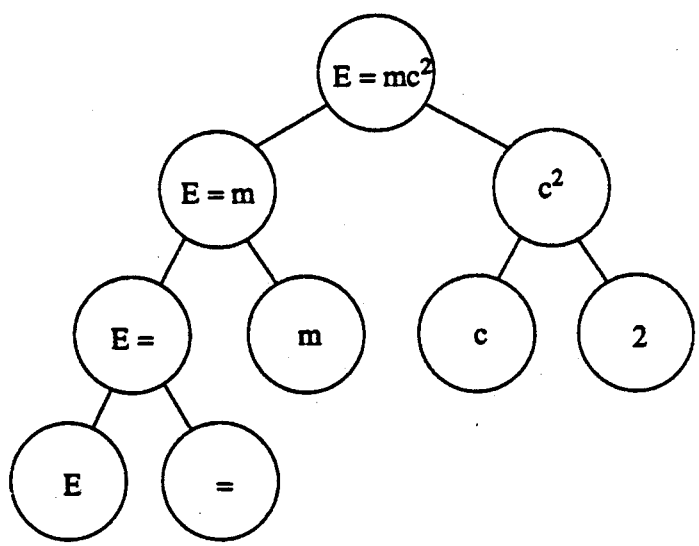

IMAGE RECOGNITION METHOD USING TWO-DIMENSIONAL STOCHASTIC GRAMMARS

TECHNICAL FIELD

The invention relates to the field of pattern recognition in general and, in particular, to the field of bit-mapped image recognition.

BACKGROUND OF THE INVENTION

Formal grammars have been used in the past in linguistics and computer science, where, for example, basic parsing algorithms have been developed. By formal grammars, it is meant the set of rules which define the allowable formats (syntax) that statements in a language in question are allowed to take. Grammers may be characterized as unrestricted, context-sensitive, context-free, and regular. The formal definitions of these four classifications are discussed in the detailed description of the invention. By parsing, it is meant the partitioning of a grammatical statement into its constituent parts to aid the automatic interpretation of a statement by a computer or other means. For example, the Cocke-Younger-Kasami parsing algorithm, described in INTRODUCTION TO AUTOMATA THEORY, LANGUAGES, AND COMPUTATION by Hopcroft and Ullman; Addison-Wesley, 1979; has become a standard parsing tool. The notion of grammars with attributes is developed in a paper SEMANTICS OF CONTEXT-FREE LANGUAGES by Knuth; Journal of Mathematical System Theory; 2:127–146; 1968. High dimensional grammars, of which two-dimensional grammars is a special case, have been studied for use in pattern recognition in general. An example of such a study is SYNTACTIC PATTERN RECOGNITION AND APPLICATIONS; K. S. Fu; Prentice-Hall; 1982. Stochastic regular grammars as used in speech recognition may be attributed to J. K. Baker; THE DRAGON SYSTEM; IEEE TRANSACTIONS ON ACOUSTIC SPEECH AND SIGNAL PROCESSING; ASSP 23:24–29; 1975 and STOCHASTIC MODELING AS A MEANS OF AUTOMATIC SPEECH RECOGNITION; PhD Thesis; Carnegie-Mellon University; 1975. Stochastic, as used here, refers to the use of probabilities associated with the possible parsing of a statement to deal with real world situations characterized by noise, distortion and uncertainty. Stochastic context-free grammars for speech recognition have also been proposed by Baker in his paper TRAINABLE GRAMMARS FOR SPEECH RECOGNITION, Speech Communication Papers of the 97th Meeting of ASA, MIT, Cambridge, Mass., Jun. 12–16, 1979 though in practice little has been done in this area.

Some of the principles developed in the pattern recognition field have been suggested for printed object recognition. For example, the use of two-dimensional nonstochastic context-free grammars for recognizing printed equations is suggested by R. H. Anderson in chapter 7 of K. S. Fu, ed. SYNTACTIC PATTERN RECOGNITION; pp 147–177; Springer-Verlag; Berlin, 1977. W. W. Stallings has also suggested in Chapter 5 of the same book the principle of using similar two-dimensional techniques for the recognition of printed Chinese characters.

Commerical optical character recognition systems are also available for scanning documents containing graphics characters and for converting the scanned objects into the undelying text. Such systems, as far as is known, are primarily intended to produce a string of text without any understanding of the meaning of the text. Instead, such known systems appear to be arranged to select the most probable character or object, on an object-by-object basis. It is believed that some of these systems use stochastic principles in some fashion to assist the selection of the most likely objects. However, the systems do not distinguish titles, abstracts, footnotes, body text etc. in a document. If intelligent recognizers can be made that are able to distinguish the underlying structures of documents, then much more intelligent object recognition systems will become possible. Such an improved system would be able to parse the underlying graphical material and then, for example, search the material on a context basis. For example, an intelligent recognizer might parse a document from an image of the document, locate an abstract of the document and search the abstract for a given phrase. As further examples, graphical equations and tables could be parsed and approriate text automatically generated for subsequent formatting and printing in other documents under the control of document formatting systems such as TeX and NROFF.

SUMMARY OF THE INVENTION

An advance is made in the art of image recognition in a method of identifying bitmapped image objects. Each of a set of templates in an object template library is compared with all areas of like size of a bitmapped image contained in a file. A set of signals is generated for each such comparison that satisfies a defined matching criteria between the template and the image area being compared. The set of signals identifies the object based on the matching template, the location of the object in the image and an indication of the goodness of the match between the object and the template. A series of possible parse trees are formed that describe the image with a probability of occurrence for each tree. Each parent node and its child nodes of each parse tree must satisfy a grammatical production rule in which some of the production rules define spatial relationships between objects in the image. The one of the possible parse trees which has the largest probability of occurrence is selected for further utilization. In the preferred embodiment, the set of grammatical production rules define a context-free grammar. Each object identified by each set of signals is tested with each other such object, including the spatial constraints associated with the objects, to determine if the combination of such objects results in a new object that satisfies the production rules. If this test is successful, the probability of the existence of the combined object in the image is generated and the new combined object is included as a possible parsing of the image, along with its probability of occurrence. After the above process is completed, the probabilities associated with each production rule and the probability of a pixel being in error in the image file may, if desired, be reestablished from the results obtained during the image recognition process. The stochastic nature of the method enables the treatment of both noise and ambiguity in a unified framework for recognition and performance can be improved by the reestablishment of the production probabilities and pixel error probabilities. The use of stochastic context-free grammars in document recognition easily handles noise, ambiguity, and touching objects. Complex two-dimensional structures, such as document layouts, tables and equations, are also easily handled.

BRIEF DESCRIPTION OF THE DRAWINGS

In the drawing.

FIG. 11 shows a table PHRASELIST containing all objects determined to be possible parses of an example equation E=mc sup 2 contained in a bitmapped image file; and FIGS. 12 and 13 show parse trees of two of the objects contained in PHRASELIST.

DETAILED DESCRIPTION

Figure 1:
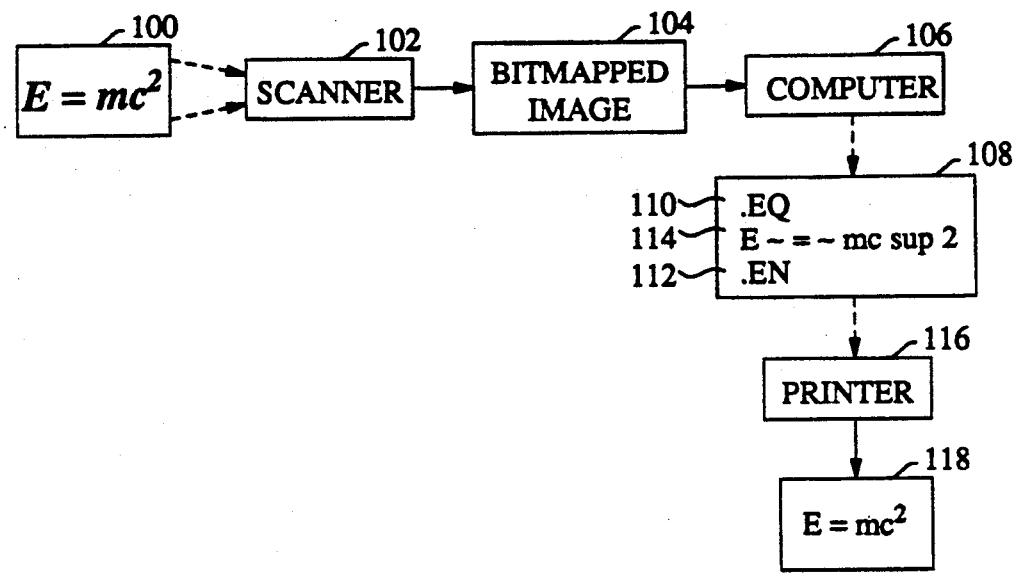
FIG. 1 shows one example of the use of an intelligent image recognition system to parse equations and to generate script files for the subsequent formatted printing of the equations using NROFF notation.

FIG. 1 illustrates one system that makes use of the invention to convert an image of an equation into a form for printing with a document formatter. For illustration only, this example assumes that document production is accomplished with the NROFF formatting program that is usually associated with the UNIX (R) operating system available from AT&T. Therefore, the illustrative output of the system of FIG. 1 at 108 is a file in NROFF format. In this example, a document 100 contains a graphical representation of the equation $E=mc^2$. A bitmapped binary image file 104 is generated from this hardcopy image by means of any suitable scanning device 102. This bitmapped file is inputted into any suitable computer 106 programmed in accordance with the disclosure below to produce the output file 108 for further formatted document production. In one illustrative embodiment, a mainframe Alliant FX/80 computer has been used satisfactorily for computer 106.

In NROFF format, formatting for an equation is indicated in a document by embedding on a line by itself the control sequence ".EQ" This is shown at 110 of the file 108. An equation is ended by similarly embedding the control sequence ".EN", as shown at 112. The commands specifying the equation to be generated is set out using other appropriate commands between the .EQ and .EN control sequences. The command for the original equation E=mc sup 2 is shown at 114. Here, the tilde "~" characters are used to tell the NROFF formatter to insert spaces before and after the equal sign. The phrase "sup 2" informs the formatter that the character "2" is a power superscript modifying the previous character "c". When the NROFF formatter is executed with the file 108 as its input, it produces another printer control file (not shown), which contains the actual data specific to the printer 116 at hand to cause it to print the equation as a page 118 in a selected font and typesize.

Computer 106 is programmed to perform the intelligent object recognition function required for the example of FIG. 1. Flowcharts of the algorithm are shown in FIGS. 4 through 9. For completeness, a listing of the source code is included in the Appendix. This source code is written in the language C++. C++ is readily understood by any programmer skilled in this language and will therefore not be described in detail. The C++ language is described in detail in a number of available books, including the book C++, Bjarne Stroustrup, Addison Wesley, 1986.

Figure 2:
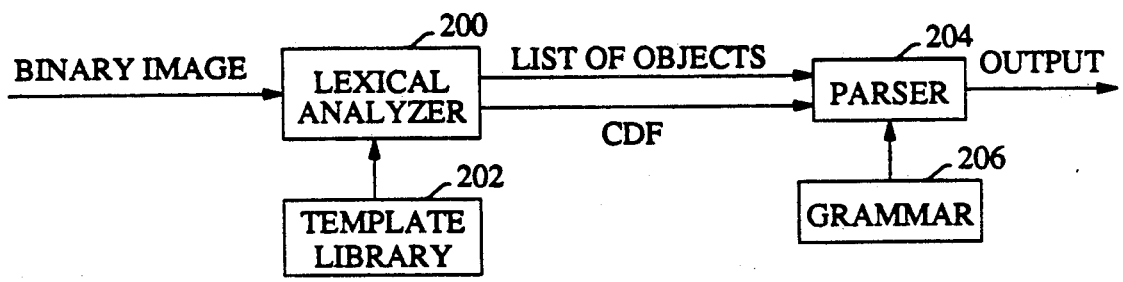
FIG. 2 shows the primary components of an illustrative intelligent object recognition system, a lexical analyzer operating in conjunction with a library of graphical object templates and a parser operating in conjunction with a set of grammatical rules.
Figure 3:
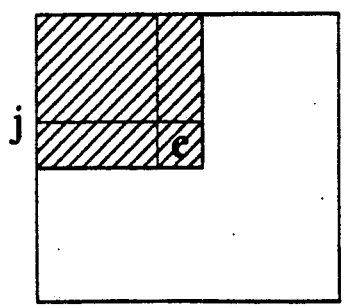
FIG. 3 shows an illustrative layout of a cumulative distribution file used to convey the spatial density of black pixels in an object recognized as part of a document under parsing.

The elements shown in FIG. 2 are program elements which are executed on the computer 106. The binary image file representing a document on which object recognition is to be performed is inputted to a lexical analyzer 200, whose function is to generate a list of all possible objects in the image file. The operation of the analyzer is straight forward and no detailed flowchart is provided. A template library 202 is provided which contains a number of n x m bitmapped templates of all of the image objects of possible interest for the task at hand. The analyzer 200 compares each n x m area of the image file to each n x m template to discover a possible match. A match is defined as a comparison in which the number of matching pixels between the image area being compared and the template exceed a predetermined threshold. Each such possible match is outputted from the analyzer 200 as a entry in a sequential list. Each such possible match entry in the list includes other information, such as an identification of the corresponding object (the template), the x and y coordinates of the location in the image file of the object, a measure of the probability that the object corresponding to the template is indeed present in the image file and other attributes of the object such as pointsize. The probability is determined by the number of matching pixels in the image relative to the number of mismatching pixels. The analyzer 200 also generates a cumulative distribution file (CDF) for the image file. The CDF is a file of the same dimensions i x j as the image file, where i and j refer to x and y pixel coordinates of the image file. Each entry of CDF, corresponding to each pixel of the image file, contains a count C of the number of black pixels in a rectangle of the image file illustratively bounded by the pixel coordinates 0,0 and i,j, as shown in FIG. 3. Both the list of possible objects and the CDF are inputted to the parser 204, which is next described. Also available to the parser is a set of production rules 206 that define the grammar for the problems at hand.

Figure 4:
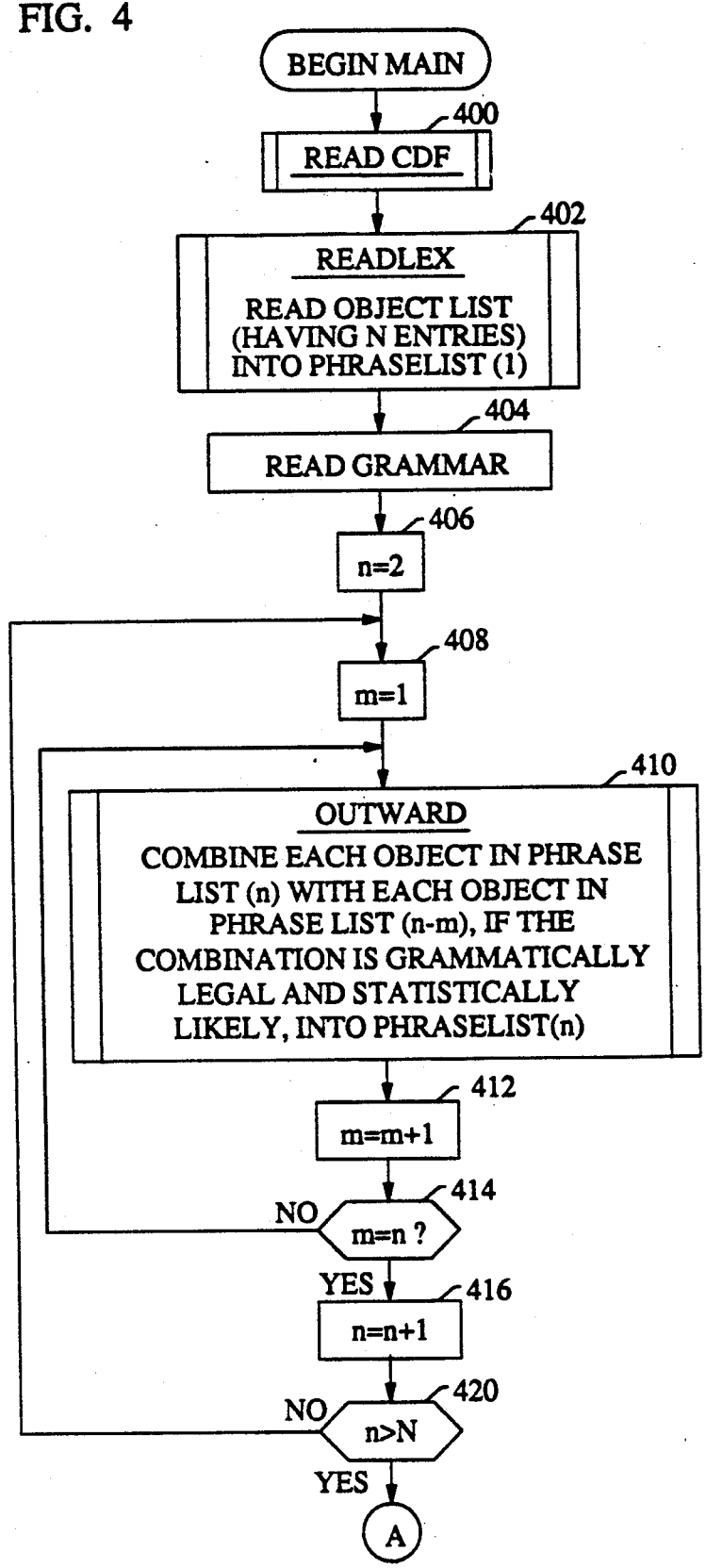
FIGS. 4 through 10 show illustrative flowcharts of the parser and related teaching aids.
Figure 5:
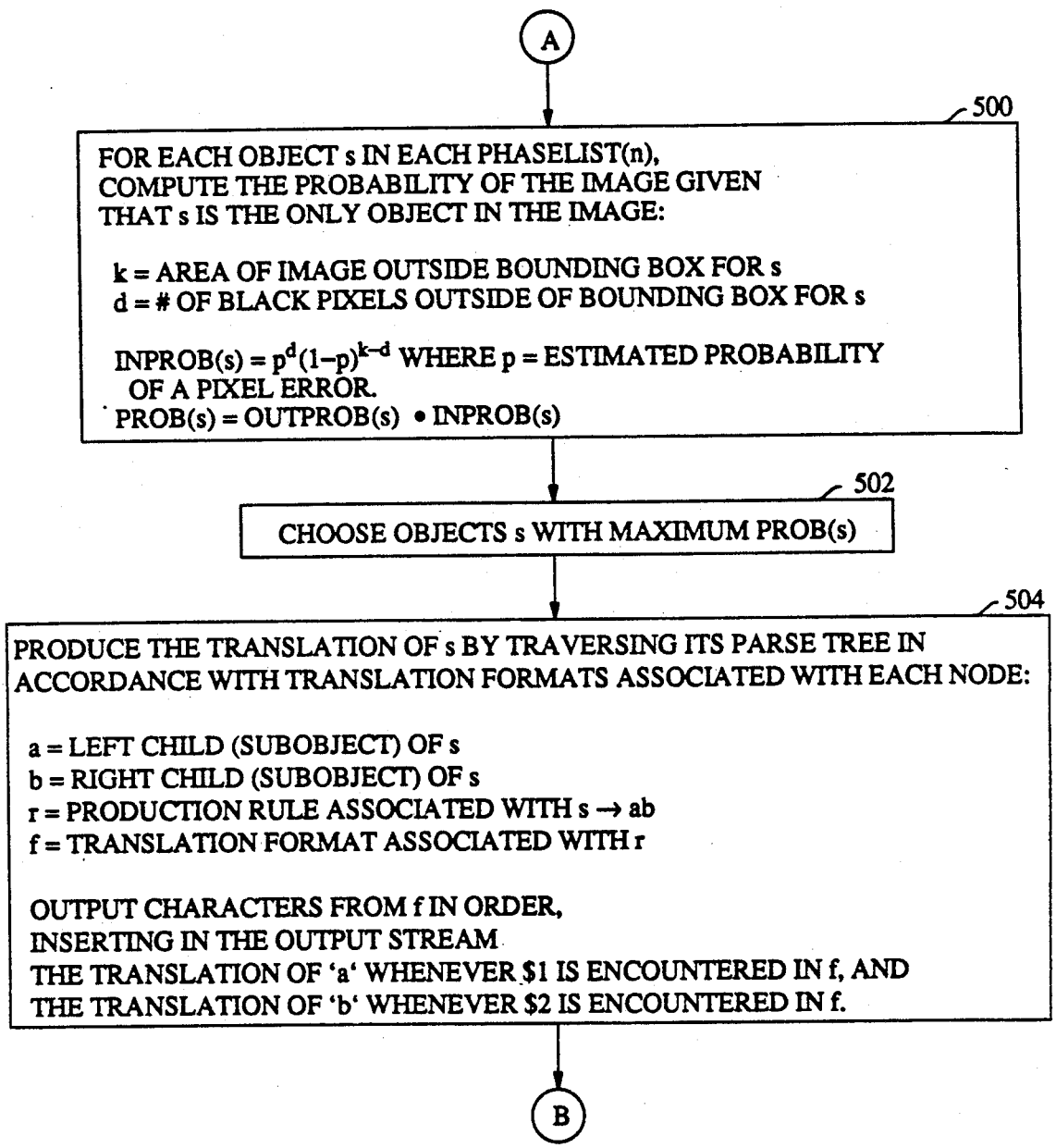
Figure 6:
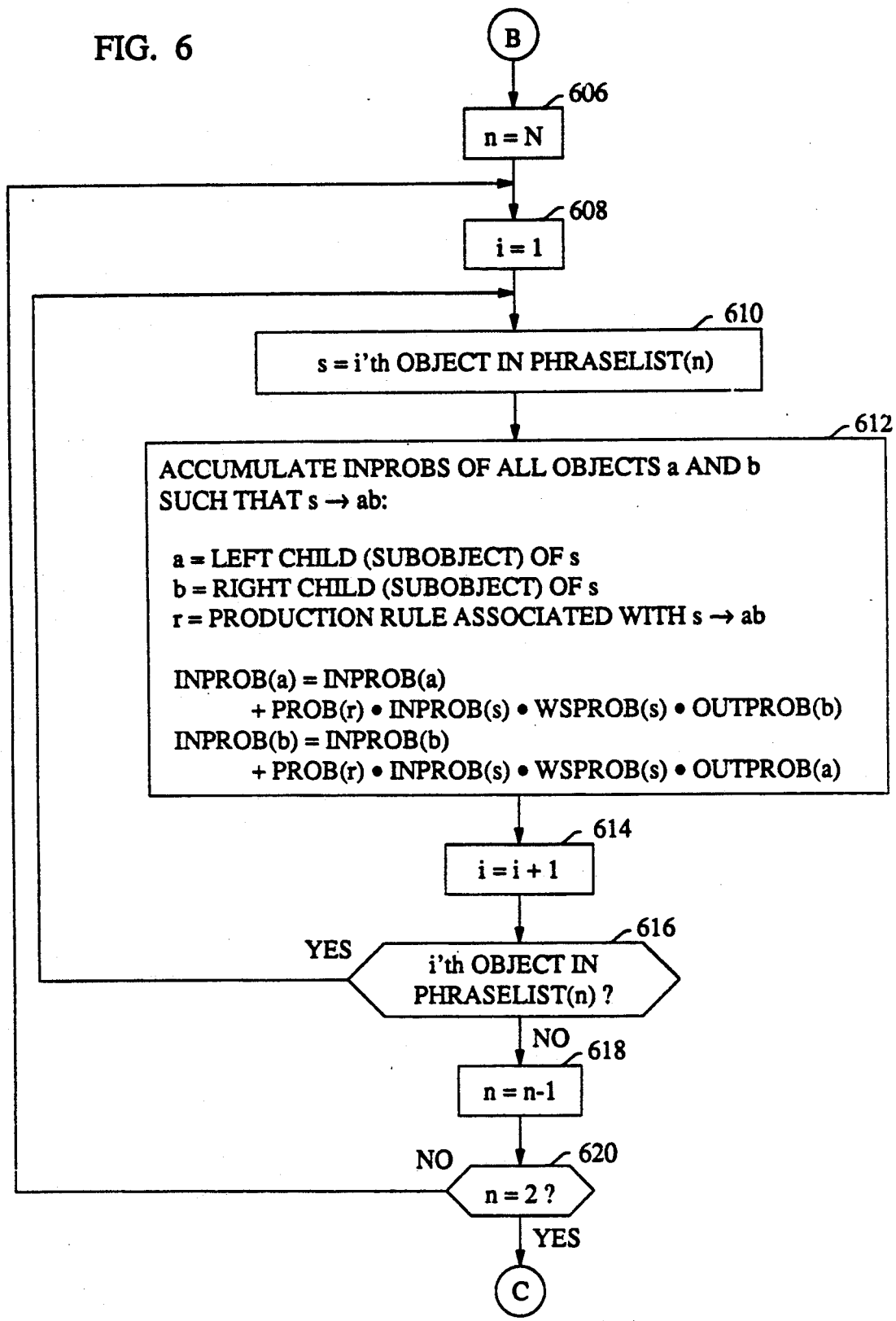
Figure 7:
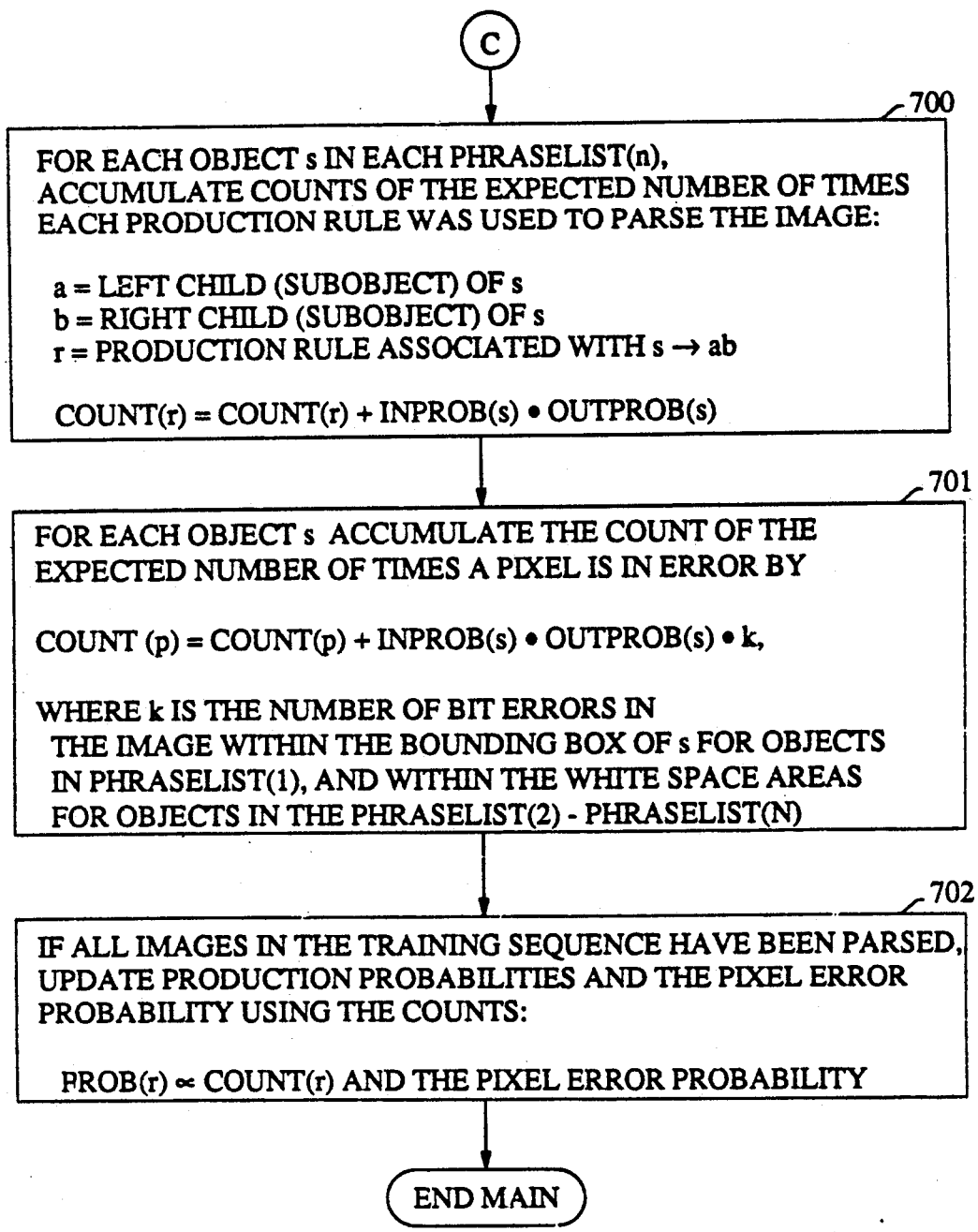

The beginning of the parser 204 is a procedure called MAIN, shown in FIG. 4. Step 400 of MAIN initially calls a subroutine READCDF to read in the CDF file. Step 402 calls a subroutine READLEX which reads the list of possible objects generated by the analyzer 200 into the first row of an array PHRASELIST, shown in FIG. 10. Step 404 next reads in a set of rules that define the context-free grammar that governs this execution of the parser. As an aside, these rules for equation recognition are built-into the C++ code included in the Appendix. However, for general operation, it is preferable to load different sets of rules for differing applications. The illustrative grammatical rules for the illustration at hand, equation recognition, are as follows:

1. S→<Expression>
2. <Expression>→<Expression>:<Factor>
3. <Expression>→<Factor>
4. <Factor>→<ExpressionOverExpression>
5. <Factor>→<Symbol>
6. <Factor>→<ExpressionBigOpExpression>
7. <Factor>→<SymbSupSub>
8. <ExpressionOverExpression>→<Expression>-/<OverExpression>

9. <OverExpression>→<Over>/<Expression>
10. <ExpressionBigOpExpression>→<Expression>/<BigOpExpression>
11. <BigOpExpression>→<BigOp>/<Expression>
12. <SymbSupSub>→<Symbol>:<SupScript>
13. <SymbSupSub>→<Symbol>:<SubScript>
14. <SymbSupSub>→<Symbol>:<SupSubScript>
15. <SupScript>→<Expression>
16. <SubScript>→<Expression>
17. <SupSubScript>→<Expression>/<Expression>

Here, the start symbol S represents the expression in the entire image file itself. One example of such an image might be the equation $$\frac{\pi^2}{6} = \sum_{n=1}^{\infty} \frac{1}{n^2}.$$

Such an <Expression> in turn represents either another <Expression> followed horizontally by a <Factor> (here, $$\frac{\pi^2}{6} = \sum_{n=1}^{\infty} \text{ followed by } \frac{1}{n^2})$$

or a <Factor> by itself. A <Factor> in turn, is a nonterminal representing an expression that cannot be horizontally subdivided, such as a fraction $$\left[\frac{1}{n^2}\right],$$

an elementary symbol (=), a big operator $$\left[\sum_{n=1}^{\infty}\right],$$

or an elementary symbol that has been subscripted or superscripted ($\pi^2$). A nonterminal is an expression on the left-hand side of a grammatical production rule and that may correspond to one or more objects in the image. A terminal in linguistics in general is considered to be a word that appears in a sentence that cannot be further grammatically decomposed. In the context of the invention, a terminal refers to a pixel of the image, as will become clear. The remaining production rules listed above map <Factor> to one of these alternatives. <Over> refers to a horizontal bar, as in a division operator, for example. <BigOp> refers to a set of mathematical operators. Such a set might include the operators for integration, summation, logical union and intersection, etc. The colon (:) in the rules indicates horizontal concatenation of expressions while the slash (/) indicates vertical concatenation. Each rule, although not shown, has associated with it spatial constraints governing its applicability. Thus, for example, the rule <ExpressionOverExpression> = <Expression>-/<OverExpression> has spatial constraints describing how close <Expression> must be to <OverExpression> in order for this rule to apply to a given set of objects. In addition, each rule has stored with it (not shown) a format for eventually generating an output conversion. In this example, the output conversion is a text string for the NROFF formatter. Thus, for example, the format associated with rule 2 is simply $1$2, where $1 and $2 are variables to be replaced with text describing the objects that are mapped by this rule. As another example, the format stored with rule 12 is {$1} sup {$2}, where sup is the NROFF command for superscript. The brackets "{" and "}" stored in the format tell the NROFF formatter to treat as a unit everything within the brackets, e.g. the text describing the superscript $2.

In addition to the above rules, there are production rules for mapping the nonterminal <Symbol> to each of 152 nonterminal objects, representing the following letters: Roman 7 and 10 point digits 0–9, Italic 7 and 10 point lower case letters a–z, Greek 7 and 10 point lower case letters $\alpha$–$\zeta$, and special 7 and 10 point mathematical symbols $\neq, \pm, \rightarrow, ==>, \leftarrow, <==, \equiv, \approx, =, \nabla, \infty, \int, +, -, /,$ and $|$. There are also production rules for mapping the nonterminal <Over> to nonterminal objects representing 7 point horizontal lines, and for mapping the nonterminal <BigOp> to nonterminal objects representing one of the five 15 point "big operators" $\Sigma, \pi, \cup, \cap,$ and $\int$. The nonterminal objects, in turn, are mapped to rectangular arrays of pixels, which are derived from the templates in the library 202. Thus pixels, and not characters, are the terminal symbols in this grammar. The entire image file is a sentence, whose parse specifies a hierarchical structure all the way down to the pixel level.

The probability that an object maps to a template can be calculated by the Hamming distance between the pixels of the object and the template. For example, for an n x m template, any n x m area of an image file differing from the template in d places has probability $P_e^d(1-P_e)^{N-d}$. Indeed, the Hamming distance d is binomially distributed with parameters N and $P_e$, and hence has mean $NP_e$ and variance $NP_e(1-P_e)$. Using the normal approximation to the binominal (Demoivre-Laplace or Central Limit Theorems), the probability that the number of errors d is further than three standard deviations from the mean is small. Hence all productions that map a character to a bitmap with more errors than three times the standard deviation from the mean are treated as non-matching. This is called the three sigma rule}. Other noise models, such as Markov random fields, could also be satisfactorily used.

Thus, in the illustrative embodiment, the lexical analyzer 200 performs the pattern matching between the templates and the image, and applies the three sigma rule to derive a list of all objects that may appear with significant probability in the image, and their locations. Additional information placed in the list may include character height and width, probability, pointsize, baseline, and textual representation, as well as other attributes.

With reference again to step 402 of FIG. 4, the list of all possible objects from the lexical analyer is entered into row 1 of the array PHRASELIST. An example of PHRASELIST for the present example is shown in FIG. 11 for the example E=mc sup 2. The results of filling row 1 with all possible objects is shown. Reading from left to right in row n=1, the possible objects there entered from step 402 (depending upon the quality of the image) are shown. For purposes of illustration, it is assumed that the top horizontal extender of the object "E" is somewhat disconnected by noise from the rest of the body of the "E". Therefore, this part of the "E" might be treated by the analyzer 200 as a possible separate object in its own right if a template matches with sufficient probability. This accounts for the "—" shown at 1104 as a possible object. The possible objects at 1106 and 1108 correspond to the separate elements of the object "=". The remaining possible objects in row 1 of PHRASELIST are self-explanatory.

Next, the parser begins to populate the remaining rows of PHASELIST with combinations of new objects taken from all that have already been identified and that satisfy the grammatical rules with sufficient probability. This is accomplished in a nested two-stage loop shown in steps 406 through 420. Step 406 sets the outside loop counter n to 2. The inside loop counter m is set to 1 in step 408. At 410, a procedure OUTWARD is called to populate PHRASELIST(n) with objects combined from objects in PHRASELIST(m) and objects in PHRASELIST(n-m). Then m is incremented at 412 and tested at 414 to determine if the inner loop is completed. When the inner loop is completed, PHRASELIST(n) will contain all grammatically legal combinations of n objects. At step 416 n is incremented and the above process repeated until all rows have been populated up to the length of the object list N in row 1. Thus, on the next (second) pass when n=3 and m=1, OUTWARD combines all possible objects in PHRASELIST(1) with all objects in PHRASELIST(2) and then, when n=3 and m=2, combines possible objects in PHRASELIST(1). The new possible objects are entered into PHRASELIST(3), and so on. Thus, the effect of steps 406 through 420 is to find and enter in an appropriate row of PHRASELIST all objects that can be combined from other objects in PHRASELIST according to the grammatical rules.

For the example at hand, the completely populated PHRASELIST is shown in FIG. 11. Please remember that each object entry also contains other associated information, such as the probability of its actual occurrence (prob) and a pointer (rule) which points to the production rule that was used to generate the entry, etc., although this information is not shown except in the row 1 entry at 1100. During the population of PHRASELIST row I, the concatenation of the somewhat disjointed top horizontal extender of the object "E" at 1104 of row 1 will not be found to match any other object according to the grammatical rules with sufficient probability to warrant the inclusion of a combination with any other possible object. Therefore, no entry in the remaining rows of PHRASELIST includes any such combination. In row 2, the object at 1102 results from the combination of "E" with the top horizontal element of "=". The object at 1104 results from the combination of "E" with the bottom element of "=". Both of these new possible objects result because the combination spatially and probelmatically satisfies (it is assumed) rule 2 above, as does the objects "=m" and "mc" in 1106 and 1108, respectively. The last object $c^2$ in 1110 satisfies rules 2,3 and 7. The remaining objects in FIG. 11 are arrived at in the same manner as those already discussed.

Figure 8:
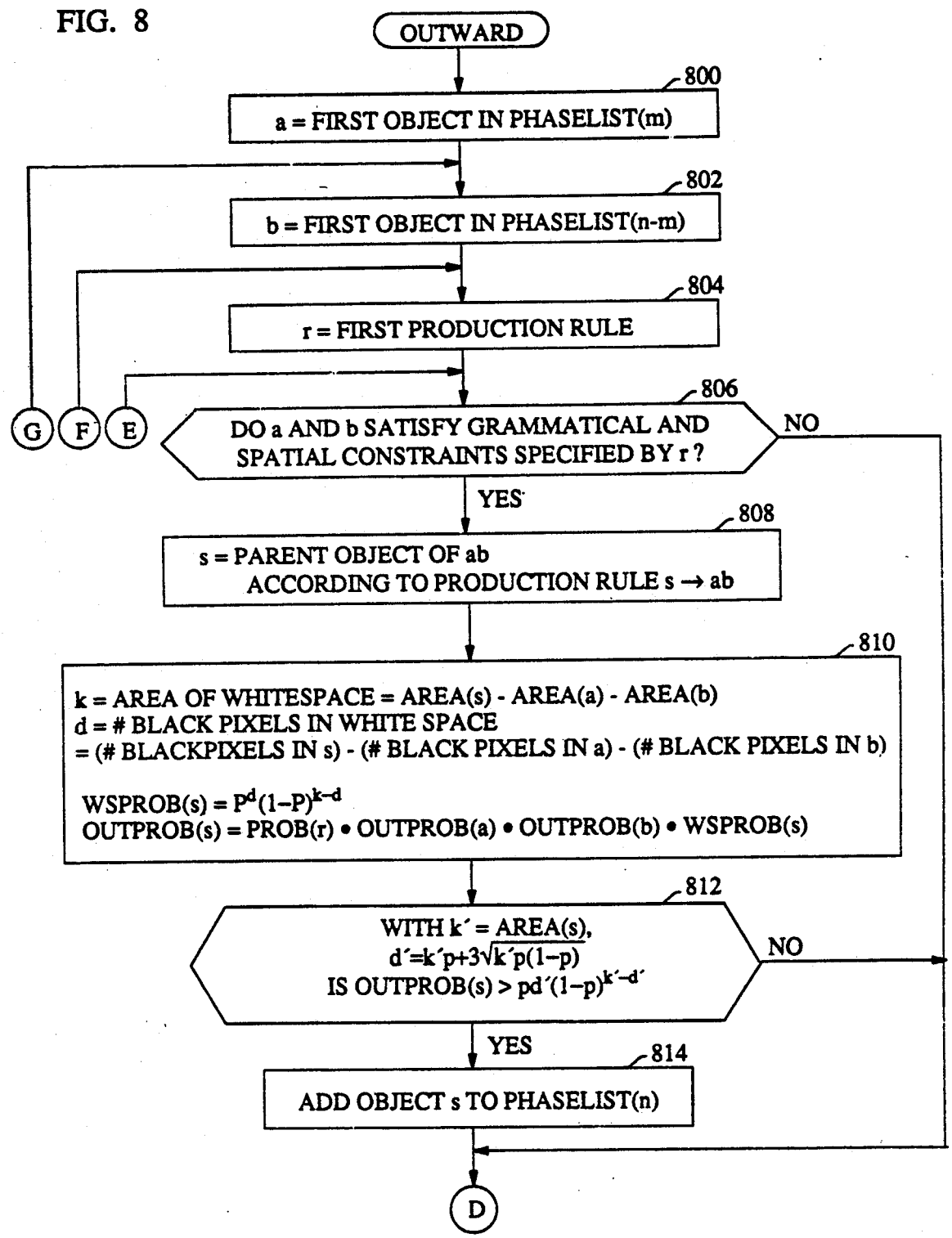
Figure 9:
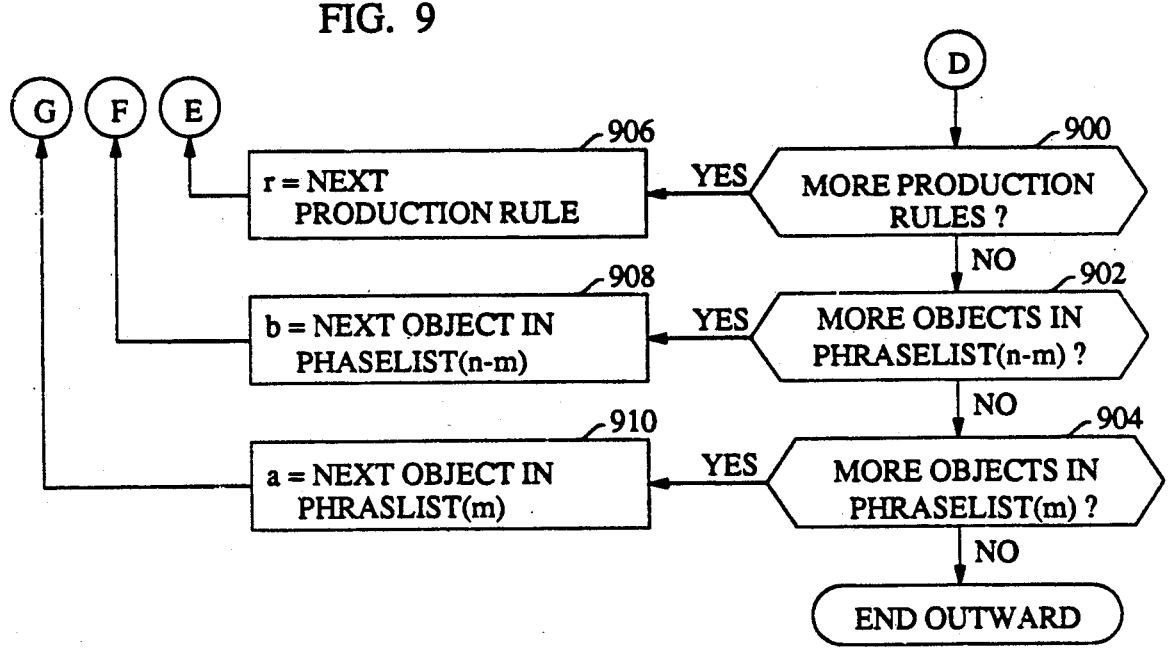
Figure 10:
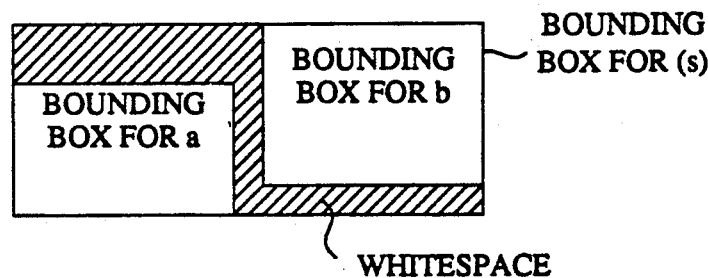

Details of OUTWARD are shown in FIGS. 8 and 9. Steps 800 through 804 inconjunction with steps 900 through 910 set up a three stage nested loop in which said present object in PHRASELIST is combined with valid other objects in PHRASELIST in accordance with the above discussion. The innermost loop tests each object combination with each rule. The remaining two outer loops control the selection of each possible object combination to be tested. Step 806 in the inner loop determines if the present combination (ab in FIG. 8) being examined satisfies the grammatical and spatial constraints of a rule r. If not, the combination is eventually discarded after all rules have been tested. If any rule is satisfied, step 808 is executed. Step 808 determines the parent object s for the present combination ab. The parent object for PHRASELIST row 2, 1100 "E=", and PHRASELIST row 1, 1110 ("m"), for example, is PHRASELIST row 3, 1100 ("E=m"). With the parent determined, steps 810 and 812 determine from an analysis of the probabilities associated with white space surrounding the individual objects whether or not this new combination should be included in PHRASELIST. To accomplish this, the notion of a bounding box is associated with each object a, b and s, as shown in FIG. 10. Bounding boxes originally are determined by the area associated with the templates of library 202. As objects are combined, the minimum and maximum extents of the x and y coordinates of the combined object determines a new bounding box for the new object. In step 810, the total whitespace k in the box for object s is calculated as the total area of the s box minus the box areas for a and b. The number of black pixels d in this whitespace is calculated using the number of black pixels in the boxes for s, a and b. The probability that what appears to be whitespace in the object s, as calculated above, is indeed whitespace is determined by the equation $$\text{wsprob}(s) = p^d(1-p)^{(k-d)},$$

where p is an empirically determined probability that one pixel is in error. Then, from all the patterns, including noise, that might be interpreted as s, the probability of the actual pattern observed, outprob(s), is determined by the equation $$\text{outprob}(s) = \text{prob}(r) * \text{outprob}(a) * \text{outprob}(b) * \text{wsprob}(s).$$

Here, outprob(a) refers to the probability associated with an object in row 1 of PHRASELIST that is determined from template matching or from a previously calculated outprob(s) for the combination of some objects in the remaining rows of PHRASELIST.

Step 812 determines if outprob(s) from step 810 is greater than a threshold $$\text{threshold} = p^{d'}(1-p)^{(k'-d')},$$

where k' equals the area of the bounding box associated with s and d' is determined by the equation $$d' = k'p + 3\sqrt{k'p(1-p)}.$$

If this threshold is exceeded, this means that the object is sufficiently likely to be part of the original image. In this case, the new object combination is added to PHRASELIST at step 814.

Once PHRASELIST is completely populated, every possible object contained therein represents a possible parsing of the correct image with some probability outprob(s) that it is correct, and each such object is associated with a parse tree. The example parse tree of FIG. 12 represents the tree for the object contained in row 3, 1102 of PHRASELIST and FIG. 13 is the tree for the object of row 5, 1100. It remains now to compute the probabilities for each parse tree and to select the most probable parsing as the correct representation of the image. Step 500 of FIG. 5 performs this function. For each object in PHRASELIST, k is set equal to the area of the original image outside the bounding box for the object s under consideration. d is set to the number of black pixels outside of the bounding box for s. Inprob(s) is the probability that, given the object s within the bounding box, the exact pixel pattern outside the bounding box was observed. Inprob(s) is then $$\text{inprob}(s) = p^d(1-p)^{(k-d)}$$

where p is again the probability of a pixel error. Under the assumption that this object is the only object in the original image, the probability that this object is the correct parsing of the image is found by $$\text{prob}(s) = \text{outprob}(s)*\text{inprob}(s).$$

After the probabilities for all the objects have been calculated, step 502 selects the parse tree with the largest probability prob(s) as the correct parsing. This should be the tree shown in FIG. 13 for the example at hand, although, in principle, noise considerations could make an earlier combination the most probable.

Step 504 illustrates one example of how the prior results might be utilized. As was mentioned, the example here assumes that a script file is to be generated that when inputted to the NROFF formatter of the UNIX system, will generate a printed output of the equation contained in the image. To accomplish this, step 504 breaks the root of the selected parse tree into its children a and b, which in the preferred embodiment is always two because of the two element form of the grammatical rules on their right-hand side. The production rule r that mapped the root into the two children is also selected. The format stored with the rule contains text, in the example at hand, and it may contain substitution operators which are variables standing for a textual description of the objects associated with the child nodes. Such variables are the $1 and $2 in step 504. The result of substituting the textual description of a variable in the format and outputting the format is shown, for example, at step 108.

The remaining steps 606 through 620 and 700 through 702 are not necessary for an understanding or practice of the invention. However, they are included here and in the Appendix for completeness. These steps retrain the probabilities associated with the templates in the library 202, according to the results derived in the present example. To do this, the combinations of objects in rows greater that 1 in PHRASELIST must be decomposed and the probabilities associated with each decomposed object recomputed.

The remaining steps 606 through 620 and 700 through 702 establish a training mode, in which the results of the recognition steps 400 through 420 and 500 through 504 are used as data to retrain the system. Specifically, steps 606 through 620 compute, for each object s, the value of inprob(s), which is the probability of the image outside the bounding box of s, given the object s. The details of how this computation is performed are given shortly. For each object s, step 700 multiplies inprob(s) by outprob(s) to obtain the probability that the object s appears in the image within its bounding box. This probability is accumulated in count(r), where r is the production rule used to construct s from its component objects. Thus, count(r) becomes the expected number of times each production rule r is used in some parse tree of the image. Every image recognized while the system is in this training mode contributes to count(r) in this way.

Step 701 computes a new probability for of a pixel being in error. This is done by comparing the objects in PHRASELIST with the original image, and accumulating the probability of a pixel error according to the equation $$\text{count}(p) = \text{count}(p) + \text{inprob}(s)*\text{outprob}(s)*k$$

where k is the number of bit errors in the image within the bounding box of s for objects in PHRASELIST(1) and within the whitespace areas of objects in PHRASELIST(2) through PHRASELIST(N). The elimination of all but the whitespace areas for the objects outside of PHRASELIST(1) prevents multiply counting errors associated with the objects already included from PHRASELIST(1).

When the training mode is terminated step 702 normalizes the counts, and sets the production probability prob(r) to count(r) for each production rule r. It also updates the pixel error probability.

Steps 606 through 620 compute inprob(a) by summing the quantity $$\text{prob}(r)*\text{inprob}(s)*\text{wsprob}(s)*\text{outprob}(b)$$

over all objects s and b such that s is composed of a and b via the production rule r. In this formula, since inprob(s) must be computed before inprob(a), inprob(a) is accumulated in decreasing order of n, where n is the number of atomic objects comprising s. The outer loop 606, 618, and 620 control the decreasing order of n. The inner loop 608, 610, 614, and 616 steps through each object is composed of n atomic objects. Step 612 performs the actual accumulation of inprob(a).

It is to be understood that the above described arrangments are merely illustrative of the application of principles of the invention and that other arrangements may be devised by workers skilled in the art without departing from the spirit and scope of the invention.

APPENDIX

```c
/* MAIN.C */
void main (
    int argc,
    char* argv[]
    ) {

// Error handler.
set_new_handler(&out_of_store);

// Initialize globals.
InitGlob(argc,argv);

// Initialize Cdf, Height, and Width.
Cdf = ReadCdf(CdfFileName,&Height,&Width);

// Initialize symbol lattice and NAtoms.
Lex = ReadLex(LexFileName,&NAtoms);

// Initialize HRTab and VRTab.
for (RULE* r=Rules; r->symbol != Atom; r++)
    Push(r,&RTab[r->alpha][r->beta]);

// Make outward pass of block sizes from small to large.
int max_blocksize_found = 1;
for (int n=1; n<2*max_blocksize_found && n<NAtoms; n++) {
    for (int m=0; m<n; m++) Outward(Lex[m],Lex[n-m-1],&Lex[n]);
    if (Lex[n]) {
        Merge(&Lex[n]);
        max_blocksize_found = n+1;
    }
}

// Initialize inward probs and keep track of most likely.
DYNAMIC optp = 0;
SYMB* opts = 0;
```

```
for (n=0; n<NAtoms; n++) {
    for (SYMB* s=Lex[n]; s; s=s->next) {
        int area = Height*Width - s->height*s->width;
        int dist = Cdf[Height][Width]
            - Cdf[s->ypos+s->height][s->xpos+s->width]
            + Cdf[s->ypos+s->height][s->xpos]
            + Cdf[s->ypos][s->xpos+s->width]
            - Cdf[s->ypos][s->xpos];
        s->inprob = exp(dist*LogPe + (area-dist)*LogPc);
        if (s->inprob*s->outprob > optp) {
            optp = s->inprob*s->outprob;
            opts = s;
        }
    }
}

// Print out the most likely parse.
if (opts) {
    cout << "\"";
    Parse(opts);
    cout << "\"" << endl;
}
else Error("No likely parse");

// Make inward pass of block sizes from large to small.
for (n=NAtoms-1; n>0; n--)
    for (SYMB* s=Lex[n]; s; s=s->next) Inward(s);

// Count occurrences of production rules.
double ce = 0;
double cc = 0;
for (n=0; n<NAtoms; n++)
    for (s=Lex[n]; s; s=s->next) Count(s,ce,cc);

Pe = ce / (ce+cc);
cout << "Pe ESTIMATE: " << Pe << endl;
}
```

```c
/* INITDOC.C */
#include <math.h>
#include <stream.h>
#include <strstream.h>
#include "error.h"
#include "docrec.h"

static char* Usage = "\
Usage: docrec [optionlist]\n\
Options: -c InputCdfFileName\n\
     -l InputLexFileName\n\
     -p Pe0
     -h HorzMinGap\n\
     -H HorzMaxGap\n\
     -v VertMinGap\n\
     -V VertMaxGap\n";

/****************************************************************

NAME:   InitGlob(argc,argv)

DESC:   Reads command line and sets globals.

BUGS:   No error checking is performed.

****************************************************************/
void InitGlob (
    int argc,
    char* argv[]
    ) { int i = 1;
while (i < argc) {
    if (argv[i][0] != '-') Error(Usage);
    switch (argv[i++][1]) {
    case 'c':
        CdfFileName = argv[i++];
```

```
                break;
            case 'l':
                LexFileName = argv[i++];
                break;
            case 'p':
                istrstream istr(argv[i++]) >> Pe;
                LogPe = log(Pe);
                LogPc = log(1.0-Pe);
                break;
            case 'h':
                istrstream istr(argv[i++]) >> HMinGap;
                break;
            case 'H':
                istrstream istr(argv[i++]) >> HMaxGap;
                break;
            case 'v':
                istrstream istr(argv[i++]) >> VMinGap;
                break;
            case 'V':
                istrstream istr(argv[i++]) >> VMaxGap;
                break;
            default:
                Error(Usage);
            }
        }
}
/* DOCREC.C */ include <iostream.h>
include <math.h>
#include "rule.h"
include "symb.h"
#include "error.h"
#include "poppush.h"
#include "docrec.h"
#include "cdf.h"
```

```
char* CdfFileName = DEFCDF;        // cumulative distribution function
char* LexFileName = DEFLEX;        // symbol lattice
double Pe = DEFPe;            // probability of bit error
double LogPe = log(Pe);       // log probability of bit error
double LogPc = log(1.0-Pe);   // log probability of bit correct
int HMinGap = DEFHMINGAP;     // minimum allowable horizontal gap
int HMaxGap = DEFHMAXGAP;     // maximum allowable horizontal gap
int VMinGap = DEFVMINGAP;     // minimum allowable vertical gap
int VMaxGap = DEFVMAXGAP;     // maximum allowable vertical gap
int Height;                   // image height
int Width;                    // image width
CDF Cdf;                      // cumulative distribution function
int NAtoms;                   // number of atoms
SYMB* *Lex;                   // array of symbol lattices
RULE* RTab[NSYMBOLS][NSYMBOLS];    // pointers to productions
char VERSION[] = "docrec v2.0: ";  // version id typedef void (*PF)();
extern PF set_new_handler(PF);
void out_of_store() { Error("operator new failed: out of store"); }

/* READCDF.C */
#include <stream.h>
#include <fstream.h>
#include "error.h"
#include "docrec.h"
#include "cdf.h"

/****************************************************************

NAME:    Cdf = ReadCdf(CdfFileName,&Height,&Width)

DESC:    Reads cdffile into Cdf. Returns Cdf, Height, and Width.

CALLS:   fstream(filename,input)
         fstream.read(&buf,sizeof(buf))
         new
```

**********************************************************/
```
CDF ReadCdf (
   char* CdfFileName,
   int* pHeight,
   int* pWidth
   ) {
CDF Cdf;

// Open cdffile.
fstream cdffile(CdfFileName,input);
if (!cdffile) Error("can't open cdffile ",CdfFileName);

// Read Height, Width.
cdffile.read((char*)pHeight,sizeof(int));
cdffile.read((char*)pWidth,sizeof(int));

// Read cdffile.
int size = (*pHeight+1)*(*pWidth+1);
Cdf.c = new int[size];
cdffile.read((char*)Cdf.c,size*sizeof(int));
if (!cdffile.good()) Error("bad cdffile ",CdfFileName);

return (Cdf);
}
/* READLEX.C */
#include <iostream.h>
#include <fstream.h>
#include <math.h>
#include <string.h>
#include <String.h>
#include <Map.h>
#include "symb.h"
#include "error.h"
#include "poppush.h"
#include "docrec.h"

typedef char* PSTR;
```

Mapdeclare(String,PSTR)
Mapimplement(String,PSTR)

/*******************************************************************

NAME:   Lex = ReadLex(LexFileName,&NAtoms)

DESC:   Reads lexfile into Lex. Set NAtoms. Returns Lex. Input
format:
    symbol,xpos,ypos,width,height,baseline,pointsize,area,dist,prob,trans CALLS:  fstream(filename,input)
    Error()

*******************************************************************/
SYMB** ReadLex (
    char* LexFileName,
    int* pNAtoms
    ) {

Map(String,PSTR) assoc(0);   // associative map
String Str;                  // generic String
char str[50];                // generic string // Open lexfile.
ifstream lexfile(LexFileName);
if (!lexfile) Error("can't open lexfile ",LexFileName);

// Read lattice.
SYMB* l = 0;            // new symbol list
for(int n=0;;n++) {
    SYMB* s = new SYMB;
    INTERP* t = new INTERP;
    char delim;
    lexfile >> s->symbol >> s->xpos >> s->ypos >> s->width
        >> s->height >> s->baseline >> s->pointsize
        >> t->area >> t->dist >> t->prob >> delim;

```
if (!lexfile) { delete s; delete t; break; }
s->outprob = t->wsprob = t->prob
    = exp(t->dist*LogPe+(t->area-t->dist)*LogPc);
s->inprob = 0;
s->list = t;
char* f = str;
do lexfile.get(*f); while (*f++ != delim);
*(f-1) = ' '; // overwrite the delimiter
Str = str;
f = assoc[Str];
if (f == 0) {
    f = new char[length(Str)+1];
    strcpy(f,str);
    assoc[Str] = f;
    }
t->trans = f;
Push(s,&l);
}
*pNAtoms = n;
SYMB** Lex = new SYMB*[n];
while (n>1) Lex[--n] = 0;
Lex[0] = l;
return Lex;
}
/* OUTWARD.C */
#include  <math.h>
#include  "dynamic.h"
#include  "rule.h"
#include  "symb.h"
#include  "poppush.h"
#include  "docrec.h"

inline short max(short m, short n) { return n>m? n:m; }
inline short min(short m, short n) { return n<m? n:m; }

/*****************************************************************
```

NAME:   Outward(Lat[m],Lat[n-m-1],&Lat[n])

DESC:   Calculate outprobs of all symbols consisting of n+1 terminals composed of symbols of m+1 terminals and symbols of n-m terminals.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*/

```
void Outward (
    SYMB* A,
    SYMB* B,
    SYMB** S
    ) {

SYMB* s = new SYMB;
INTERP* t = new INTERP;

for (SYMB* a=A; a; a=a->next)
    for (SYMB* b=B; b; b=b->next)
        for (RULE* r=RTab[a->symbol][b->symbol]; r; r=r->next) {

// Check gap, overlap, baseline and pointsize.
        DYNAMIC p = r->prob(s,a,b);
        if (p == 0) continue;   //doesn't satisfy spatial conditions // Compute bounding box of a and b.
        s->symbol = r->symbol;
        s->xpos = min(a->xpos,b->xpos);
        s->ypos = min(a->ypos,b->ypos);
        s->width = max(a->xpos+a->width,b->xpos+b->width) - s->xpos;
        s->height = max(a->ypos+a->height,b->ypos+b->height) - s->ypos;
        // s->baseline set by r->prob(s,a,b)
        // s->pointsize set by r->prob(s,a,b)
        s->list = t;
        int area = s->width*s->height;
        int dist = (int)(area*Pe+3.0*sqrt(area*Pe*(1.0-Pe))+0.9999);

// Compute intervening whitespace.
        t->area = area - a->width*a->height - b->width*b->height;
```

```
t->dist = Cdf[s->ypos+s->height][s->xpos+s->width]
    - Cdf[s->ypos+s->height][s->xpos]
    - Cdf[s->ypos][s->xpos+s->width]
    + Cdf[s->ypos][s->xpos]
    - Cdf[a->ypos+a->height][a->xpos+a->width]
    + Cdf[a->ypos+a->height][a->xpos]
    + Cdf[a->ypos][a->xpos+a->width]
    - Cdf[a->ypos][a->xpos]
    - Cdf[b->ypos+b->height][b->xpos+b->width]
    + Cdf[b->ypos+b->height][b->xpos]
    + Cdf[b->ypos][b->xpos+b->width]
    - Cdf[b->ypos][b->xpos];
t->prob = a->outprob * b->outprob;

// Adjust for intersection of a and b.
short ix = max(a->xpos,b->xpos);
short iy = max(a->ypos,b->ypos);
short iw = min(a->xpos+a->width,b->xpos+b->width) - ix;
short ih = min(a->ypos+a->height,b->ypos+b->height) - iy;
if (iw>0 && ih>0) {
    t->area += iw*ih;
    t->dist += Cdf[iy+ih][ix+iw]
        - Cdf[iy+ih][ix]
        - Cdf[iy][ix+iw]
        + Cdf[iy][ix];
    DYNAMIC maxp = exp((area - t->area)*LogPc);
    if (t->prob*=exp(-iw*ih*LogPe) > maxp) t->prob = maxp;
} t->wsprob = exp(t->dist*LogPe + (t->area-t->dist)*LogPc);
t->prob *= p * r->ruleprob * t->wsprob;
if (t->prob < exp(dist*LogPe + (area-dist)*LogPc)) break;

s->outprob = t->prob;
s->inprob = t;
t->A = a;
t->B = b;
```

```
        t->cat = r->cat;
        t->trans = r->trans;
        Push(s,S);
        s = new SYMB;
        t = new INTERP;

delete s;
delete t;
}
/* MERGE.C */
#include <Map.h>
#include "symb.h"
#include "poppush.h"
#include "docrec.h"

struct KEY {
    short S;        // symbol
    short X;        // x position
    short Y;        // y position
    short W;        // width
    short H;        // height
    short B;        // baseline
    short P;        // pointsize
    KEY(short s=0,short x=0,short y=0,short w=0,short h=0,short b=0,short p=0)
    { S=s; X=x; Y=y; W=w; H=h; B=b; P=p; }
    int operator<(const KEY& k)
    { return S<k.S X<k.X Y<k.Y W<k.W H<k.H B<k.B P<k.P; }
};

typedef SYMB* PSYMB;
Mapdeclare(KEY,PSYMB)
Mapimplement(KEY,PSYMB)

/*****************************************************************
```

NAME: Merge(&Lat[n])

DESC: Merges different interpretations of the same symbol.
Symbols are considered equal if they have the same
symbol,xpos,ypos,width,height,baseline,pointsize.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*/

```
void Merge (
  SYMB** S
  ) {

Map(KEY,PSYMB) assoc;   // associative map to make SYMBs unique
SYMB* l = 0;     // new symbol list
SYMB* s = *S;    // old symbol list while (s) {

KEY key(s->symbol,s->xpos,s->ypos,s->width,
       s->height,s->baseline,s->pointsize);
   SYMB* v = assoc[key];
   if (v)   {
      Push(s->list,&v->list);
      v->outprob += s->outprob;
      SYMB* tmp=s->next; delete s; s=tmp;
      }
   else {
      assoc[key] = s;
      PopPush(&s,&l);
      }
   }

*S = l;
}
/* PARSE.C */
#include <iostream.h>
#include "symb.h"
```

/******************************************************************

NAME:   Parse(S)

******************************************************************/
void Parse (
   SYMB* s
   ) {

// Look for most likely interpretation.
INTERP* optt = s->list;
for (INTERP* t=optt->next; t; t=t->next)
   if (t->prob > optt->prob) optt = t;

// Interpret translation format.
for (char* f=optt->trans; *f; f++)
   if (*f != '$') cout << *f;
   else if (*++f == '$') cout << '$';
   else if (*f == '1') Parse(optt->A);
   else Parse(optt->B);
}
/* INWARD.C */
include "dynamic.h"
include "rule.h"
include "symb.h"
include "docrec.h"

/******************************************************************

NAME:   Inward(s)

DESC:   Accumulate inprobs of all symbols A and B such that s->AB.

******************************************************************/
void Inward (
   SYMB* s
   ) {

```
// Run through list of interpretations.
for (INTERP* t=s->list; t; t=t->next) { register SYMB* a = t->A;
    register SYMB* b = t->B;

if (a==0  b==0) continue; // terminal for (register RULE* r=RTab[a->symbol][b->symbol]; r; r=r->next) {
        if (r->symbol != s->symbol) continue;
        if (r->cat != t->cat) continue;
        DYNAMIC p = r->prob(s,a,b);
        if (p == 0) continue;
        p *= r->ruleprob * s->inprob * t->wsprob;
        a->inprob += p * b->outprob;
        b->inprob += p * a->outprob;
        break;
    }
  }
}
/* CO'''' C */
#include <math.h>
#include "dynamic.h"
include "symb.h"
include "docrec.h"
```

/*************************************************************

NAME:   Count(m,n,ce,cc)

DESC:   Count the expected number of bits in error and bits correct.
    Return counts in ce, cc.

*************************************************************/
void Count (
    SYMB* s,
    double& ce,

```
    double& cc
    ) {

// Run through list of interpretations.
for (INTERP* t=s->list; t; t=t->next) {
    DYNAMIC p = t->prob * s->inprob;
    ce += p * t->dist;
    cc += p * (t->area - t->dist);
    }
}
/* RULE.C */
#include "rule.h"

extern int HMinGap;
extern int HMaxGap;
extern int VMinGap;
extern int VMaxGap;

/****************************************************************

NAME:    rule.c

****************************************************************/

DYNAMIC HSymSym (SYMB* S, SYMB* A, SYMB* B) {
register SYMB* a = A;
register SYMB* b = B;
register int d = b->xpos - (a->xpos+a->width);
if (d<HMinGap    d>HMaxGap) return 0;
if (b->ypos+b->height<=a->ypos    b->ypos>=a->ypos+a->height) return 0;
if (a->baseline<b->baseline-1    a->baseline>b->baseline+1) return 0;
if (a->pointsize != b->pointsize) return 0;
register SYMB* s = S;
s->baseline = a->baseline;
s->pointsize = a->pointsize;
return 1;
}
```

```
DYNAMIC HSubScript (SYMB* S, SYMB* A, SYMB* B) {
register SYMB* a = A;
register SYMB* b = B;
register int d = b->xpos - (a->xpos+a->width);
if (d<HMinGap  d>HMaxGap) return 0;
if (b->ypos+b->height<=a->ypos  b->ypos>=a->ypos+a->height) return 0;
if (b->pointsize != a->pointsize-3) return 0;
if (b->baseline <= a->baseline) return 0;
register SYMB* s = S;
s->baseline = a->baseline;
s->pointsize = a->pointsize;
return 1;
}

DYNAMIC HSupScript (SYMB* S, SYMB* A, SYMB* B) {
register SYMB* a = A;
register SYMB* b = B;
register int d = b->xpos - (a->xpos+a->width);
if (d<HMinGap  d>HMaxGap) return 0;
if (b->ypos+b->height<=a->ypos  b->ypos>=a->ypos+a->height) return 0;
if (b->pointsize != a->pointsize-3) return 0;
if (b->baseline >= a->baseline) return 0;
register SYMB* s = S;
s->baseline = a->baseline;
s->pointsize = a->pointsize;
return 1;
}

DYNAMIC VSymSymA (SYMB* S, SYMB* A, SYMB* B) {
register SYMB* a = A;
register SYMB* b = B;
register int d = b->ypos - (a->ypos+a->height);
if (d<VMinGap  d>VMaxGap) return 0;
if (b->xpos+b->width<=a->xpos  b->xpos>=a->xpos+a->width) return 0;
if (b->pointsize != a->pointsize) return 0;
register SYMB* s = S;
s->baseline = a->baseline;
```

```
s->pointsize = b->pointsize;
return 1;
}

DYNAMIC VSymSymB (SYMB* S, SYMB* A, SYMB* B) {
register SYMB* s = S;
register SYMB* a = A;
register SYMB* b = B;
register int d = b->ypos - (a->ypos+a->height);
if (d<VMinGap   d>VMaxGap) return 0;
if (b->xpos+b->width<=a->xpos   b->xpos>=a->xpos+a->width) return 0;
if (b->pointsize != a->pointsize) return 0;
s->baseline = b->baseline;
s->pointsize = b->pointsize;
return 1;
}

DYNAMIC VToOp (SYMB* S, SYMB* A, SYMB* B) {
register SYMB* a = A;
register SYMB* b = B;
register int d = b->ypos - (a->ypos+a->height);
if (d<VMinGap   d>VMaxGap) return 0;
if (b->xpos+b->width<=a->xpos   b->xpos>=a->xpos+a->width) return 0;
if (a->pointsize != b->pointsize-3) return 0;
register SYMB* s = S;
s->baseline = b->baseline;
s->pointsize = b->pointsize;
return 1;
}

DYNAMIC VOpFrom (SYMB* S, SYMB* A, SYMB* B) {
register SYMB* a = A;
register SYMB* b = B;
register int d = b->ypos - (a->ypos+a->height);
if (d<VMinGap   d>VMaxGap) return 0;
if (b->xpos+b->width<=a->xpos   b->xpos>=a->xpos+a->width) return 0;
if (b->pointsize != a->pointsize-3) return 0;
```

```
register SYMB* s = S;
s->baseline = a->baseline;
s->pointsize = a->pointsize;
return 1;
}

RULE Rules[] = {

// Expression.
{ Expression, Atom, Atom, H, 1/20.0, HSymSym, "$1$2" },
{ Expression, Atom, BigOp, H, 1/20.0, HSymSym, "$1$2" },
{ Expression, Atom, Factor, H, 1/20.0, HSymSym, "$1$2" },
{ Expression, Atom, BigOpExpr, H, 1/20.0, HSymSym, "$1$2" },
{ Expression, BigOp, Atom, H, 1/20.0, HSymSym, "$1$2" },
{ Expression, BigOp, BigOp, H, 1/20.0, HSymSym, "$1$2" },
{ Expression, BigOp, Factor, H, 1/20.0, HSymSym, "$1$2" },
{ Expression, BigOp, BigOpExpr, H, 1/20.0, HSymSym, "$1$2" },
{ Expression, Factor, Atom, H, 1/20.0, HSymSym, "$1$2" },
{ Expression, Factor, BigOp, H, 1/20.0, HSymSym, "$1$2" },
{ Expression, Factor, Factor, H, 1/20.0, HSymSym, "$1$2" },
{ Expression, Factor, BigOpExpr, H, 1/20.0, HSymSym, "$1$2" },
{ Expression, BigOpExpr, Atom, H, 1/20.0, HSymSym, "$1$2" },
{ Expression, BigOpExpr, BigOp, H, 1/20.0, HSymSym, "$1$2" },
{ Expression, BigOpExpr, Factor, H, 1/20.0, HSymSym, "$1$2" },
{ Expression, BigOpExpr, BigOpExpr, H, 1/20.0, HSymSym, "$1$2" },
{ Expression, Expression, Atom, H, 1/20.0, HSymSym, "$1$2" },
{ Expression, Expression, BigOp, H, 1/20.0, HSymSym, "$1$2" },
{ Expression, Expression, Factor, H, 1/20.0, HSymSym, "$1$2" },
{ Expression, Expression, BigOpExpr, H, 1/20.0, HSymSym, "$1$2" }, // Fraction.
{ Factor, Atom, OverExpr, V, 1/23.0, VSymSymB, "{$1} $2" },
{ Factor, Factor, OverExpr, V, 1/23.0, VSymSymB, "{$1} $2" },
{ Factor, Expression, OverExpr, V, 1/23.0, VSymSymB, "{$1} $2" },
{ OverExpr, Over, Atom, V, 1/3.0, VSymSymA, "over {$2}" },
{ OverExpr, Over, Factor, V, 1/3.0, VSymSymA, "over {$2}" },
{ OverExpr, Over, Expression, V, 1/3.0, VSymSymA, "over {$2}" },
```

// Subscripted Variable.
{ Factor, Atom, Atom, H, 1/23.0, HSubScript, "$1 sub {$2}" },
{ Factor, Atom, Factor, H, 1/23.0, HSubScript, "$1 sub {$2}" },
{ Factor, Atom, Expression, H, 1/23.0, HSubScript, "$1 sub {$2}" },
{ Factor, BigOp, Atom, H, 1/23.0, HSubScript, "$1 sub {$2}" },
{ Factor, BigOp, Factor, H, 1/23.0, HSubScript, "$1 sub {$2}" },
{ Factor, BigOp, Expression, H, 1/23.0, HSubScript, "$1 sub {$2}" }, // Superscripted Variable.
{ Factor, Atom, Atom, H, 1/23.0, HSupScript, "$1 sup {$2}" },
{ Factor, Atom, Factor, H, 1/23.0, HSupScript, "$1 sup {$2}" },
{ Factor, Atom, Expression, H, 1/23.0, HSupScript, "$1 sup {$2}" },
{ Factor, BigOp, Atom, H, 1/23.0, HSupScript, "$1 sup {$2}" },
{ Factor, BigOp, Factor, H, 1/23.0, HSupScript, "$1 sup {$2}" },
{ Factor, BigOp, Expression, H, 1/23.0, HSupScript, "$1 sup {$2}" }, // Subscripted and Superscripted Variable.
{ Factor, Atom, SubSupScript, H, 1/23.0, HSubScript, "$1 $2" },
{ Factor, BigOp, SubSupScript, H, 1/23.0, HSubScript, "$1 $2" },
{ SubSupScript, Atom, Atom, V, 1/9.0, VSymSymB, "sub {$2} sup {$1}" },
{ SubSupScript, Atom, Factor, V, 1/9.0, VSymSymB, "sub {$2} sup {$1}" },
{ SubSupScript, Atom, Expression, V, 1/9.0, VSymSymB, "sub {$2} sup {$1}" },
{ SubSupScript, Factor, Atom, V, 1/9.0, VSymSymB, "sub {$2} sup {$1}" },
{ SubSupScript, Factor, Factor, V, 1/9.0, VSymSymB, "sub {$2} sup {$1}" },
{ SubSupScript, Factor, Expression, V, 1/9.0, VSymSymB, "sub {$2} sup {$1}" },
{ SubSupScript, Expression, Atom, V, 1/9.0, VSymSymB, "sub {$2} sup {$1}" },
{ SubSupScript, Expression, Factor, V, 1/9.0, VSymSymB, "sub {$2} sup {$1}" },
{ SubSupScript, Expression, Expression, V, 1/9.0, VSymSymB, "sub {$2} sup {$1}" }, // Big Operator with Upper Limit.
{ Factor, Atom, BigOp, V, 1/23.0, VToOp, "$2 to {$1}" },
{ Factor, Factor, BigOp, V, 1/23.0, VToOp, "$2 to {$1}" },
{ Factor, Expression, BigOp, V, 1/23.0, VToOp, "$2 to {$1}" }, // Big Operator with Lower Limit.
{ BigOpExpr, BigOp, Atom, V, 1/3.0, VOpFrom, "$1 from {$2}" },
{ BigOpExpr, BigOp, Factor, V, 1/3.0, VOpFrom, "$1 from {$2}" }, { BigOpExpr, BigOp, Expression, V, 1/3.0, VOpFrom, "$1 from {$2}" }, // Big Operator with Upper and Lower Limits.
{ Factor, Atom, BigOpExpr, V, 1/23.0, VToOp, "$2 to {$1}" },
{ Factor, Factor, BigOpExpr, V, 1/23.0, VToOp, "$2 to {$1}" },
{ Factor, Expression, BigOpExpr, V, 1/23.0, VToOp, "$2 to {$1}" }, // End of Rules.
{ Atom }
};
/* DYNAMIC.C */
include "dynamic.h"

```
DYNAMIC::DYNAMIC(double x)
{
    if (x==0.0) { mantissa = exponent = 0; return; }
    double log2_x = log2(x);
    double flog2_x = floor(log2_x);
    mantissa = MANTISSA(exp2(log2_x-flog2_x) * ONE);
    exponent = EXPONENT(flog2_x);
}

DYNAMIC DYNAMIC::operator+=(DYNAMIC b)
{
    if (b.mantissa==0) return *this;
    if (mantissa==0) {
        mantissa = b.mantissa;
        exponent = b.exponent;
        return *this;
        }
    int d = exponent - b.exponent;
    if (d >= PRECISION) return *this;
    if (d <= -PRECISION) {
        mantissa = b.mantissa;
        exponent = b.exponent;
        return *this;
        }
```

```
   LONGMANT ma = mantissa;
   LONGMANT mb = b.mantissa;
   if (d < 0) {
      ma >>= -d;
      exponent = b.exponent;
      }
   else mb >>= d;
   ma += mb;
   if (!(ma&ONE)) { ma >>= 1; exponent++; }
   mantissa = MANTISSA(ma);
   return *this;
}

DYNAMIC DYNAMIC::operator*=(DYNAMIC b)
{
   if (mantissa==0) return *this;
   if (b.mantissa==0) { mantissa = exponent = 0; return *this; }
   LONGMANT ma = mantissa;
   LONGMANT mb = b.mantissa;
   ma *= mb;
   if ((ma>>=(PRECISION-1))&(1<<PRECISION)) { ma >>= 1; exponent++; }
   mantissa = MANTISSA(ma);
   exponent += b.exponent;
   return *this;
}

DYNAMIC DYNAMIC::operator/=(DYNAMIC b)
{
   if (b.mantissa==0) { cerr << "division by zero0; return *this; }
   if (b.mantissa!=ONE) {
      double x = (double)ONE / (double)b.mantissa;
      b.mantissa = MANTISSA(x * (ONE<<1));
      b.exponent++;
      }
   b.exponent = -b.exponent;
   return *this *= b;
}
```

```
istream& operator>>(istream& s, DYNAMIC& a)
{
    double x;
    s >> x;
    if (s) a = DYNAMIC(x);
    return s;
} ostream& operator<<(ostream& s, DYNAMIC a)
{
    if (a.mantissa==0) { s << "0"; return s; }
    double log10_a = log10((double)a.mantissa / (double)ONE)
            + a.exponent * LOG10_2;
    double flog10_a = floor(log10_a);
    s << exp10(log10_a-flog10_a);
    if (flog10_a != 0.0) s << "e" << (int)flog10_a;
    return s;
}
/* DOCREC.H */
#ifndef   docrec_h
define   docrec_h include "dynamic.h"
include "rule.h"
include "symb.h"
#include "cdf.h"

// Command line defaults.
#define DEFCDF "test.cdf"          /* cdf filename */
#define DEFLEX "test.lex"          /* lattice filename */
const double DEFPe = 0.01;         // probability of bit error
const int DEFHMINGAP = -1;         // minimum allowable horizontal gap
const int DEFHMAXGAP = 5;          // maximum allowable horizontal gap
const int DEFVMINGAP = -1;         // minimum allowable vertical gap
const int DEFVMAXGAP = 5;          // maximum allowable vertical gap // Global storage.
```

```
extern char* CdfFileName;        // cumulative distribution function
extern char* LexFileName;        // symbol lattice
extern double Pe;                // probability of bit error
extern double LogPe;             // log probability of bit error
extern double LogPc;             // log probability of bit correct
extern int HMinGap;              // minimum allowable horizontal gap
extern int HMaxGap;              // maximum allowable horizontal gap
extern int VMinGap;              // minimum allowable vertical gap
extern int VMaxGap;              // maximum allowable vertical gap
extern int Height;               // image height
extern int Width;                // image width
extern CDF Cdf;                  // cumulative distribution function
extern int NAtoms;               // number of atoms
extern SYMB* *Lex;               // array of symbol lattices
extern RULE Rules[];             // production rules
extern RULE* RTab[NSYMBOLS][NSYMBOLS];  // pointers to productions // Global functions.
extern void InitGlob(int argc, char* argv[]);
extern CDF ReadCdf(char* CdfFileName, int* pHeight, int* pWidth);
extern SYMB** ReadLex(char* LexFileName, int* pNAtoms);
extern void Outward(SYMB* A, SYMB* B, SYMB** RD
EDIT S);
extern void Merge(SYMBRD
EDIT ** S);
extern void Parse(SYMB* s);
extern void Inward(SYMB* s);
extern void Count(SYMB* s, double& ce, double& cc);

#endif
:::::::::::::::
docrec.c
:::::::::::::::
#include <iostream.h>
include <math.h>
#include "rule.h"
include "symb.h"
```

```
#include "error.h"
#include "poppush.h"
#include "docrec.h"
#include "cdf.h"

char* CdfFileName = DEFCDF;      // cumulative distribution function
char* LexFileName = DEFLEX;      // symbol lattice
double Pe = DEFPe;               // probability of bit error
double LogPe = log(Pe);          // log probability of bit error
double LogPc = log(1.0-Pe);      // log probability of bit correct
int HMinGap = DEFHMINGAP;        // minimum allowable horizontal gap
int HMaxGap = DEFHMAXGAP;        // maximum allowable horizontal gap
int VMinGap = DEFVMINGAP;        // minimum allowable vertical gap
int VMaxGap = DEFVMAXGAP;        // maximum allowable vertical gap
int Height;                      // image height
int Width;                       // image width
CDF Cdf;                         // cumulative distribution function
int NAtoms;                      // number of atoms
SYMB* *Lex;                      // array of symbol lattices
RULE* RTab[NSYMBOLS][NSYMBOLS];  // pointers to productions
char VERSION[] = "docrec v2.0: "; // version id typedef void (*PF)();
extern PF set_new_handler(PF);
void out_of_store() { Error("operator new failed: out of store"); }

/* CDF.H */
#ifndef    cdf_h
define    cdf_h extern int Width;

struct CDF {
   int* c;
   int* operator[](int row) { return c+row*(Width+1); }
   };
``` endif
/* RULE.H */
/*****************************************************************

DESC:   Each RULE object should be unique up to
   symbol,alpha,beta,cat

*****************************************************************/
```
#ifndef    rule_h
define    rule_h include "dynamic.h"
include "symb.h"

// Production Rule.
struct RULE {
    short symbol;              // S -> AB
    short alpha;               // A
    short beta;                // B
    short cat;                 // H or V concatenation
    DYNAMIC ruleprob;          // production prob
    DYNAMIC (*prob)(SYMB* S, SYMB* A, SYMB* B);  // production prob
    char* trans;               // translation format
    RULE* next;                // next rule in list
    };

// Horz or Vert bit.
enum { V,H };

// List of all Symbols.
enum {
Atom,
Over,
BigOp,
Factor,
Expression,
OverExpr,
```

BigOpExpr,
SubSupScript,
NSYMBOLS
};

endif
/* SYMB.H */
/*********************************************************************

DESC: Each SYMB object should be unique up to
    symbol,xpos,ypos,width,height,baseline,pointsize

*********************************************************************
*/
ifndef     symb_h
define     symb_h include "dynamic.h"

struct INTERP;

// Symbol.
struct SYMB {
    short symbol;       // symbol
    short xpos;         // distance from left of symbol to left of
image
    short ypos;         // distance from top of symbol to top of image
    short width;        // width of symbol
    short height;       // height of symbol
    short baseline;     // baseline of symbol
    short pointsize;    // pointsize of symbol
    DYNAMIC outprob;    // P{inside symbol} (from outward pass)
    DYNAMIC inprob;     // P{outside symbol} (from inward pass)
    INTERP* list;       // list of interpretations
    SYMB* next;         // next symbol in list
    SYMB()              { symbol=0; list=0; next=0; }

```cpp
};

// Interpretation.
struct INTERP {
    SYMB* A;        // pointer to A
    SYMB* B;        // pointer to B
    short cat;      // H or V concatenation
    DYNAMIC prob;   // P(S->AB)P{inside A}P{inside B}P{inside ws}
    DYNAMIC wsprob; // P{inside whitespace}
    int area;       // area of intervening whitespace
    int dist;       // hamming weight of whitespace
    char* trans;    // translation format
    INTERP* next;   // next interpretation in list
    INTERP()        { A=B=0; next=0; }
};

endif
/* DOCREC.H */
#ifndef    docrec_h
define    docrec_h include "dynamic.h"
include "rule.h"
include "symb.h"
#include "cdf.h"

// Command line defaults.
#define DEFCDF "test.cdf"       /* cdf filename */
#define DEFLEX "test.lex"       /* lattice filename */
const double DEFPe = 0.01;      // probability of bit error
const int DEFHMINGAP = -1;      // minimum allowable horizontal gap
const int DEFHMAXGAP = 5;       // maximum allowable horizontal gap
const int DEFVMINGAP = -1;      // minimum allowable vertical gap
const int DEFVMAXGAP = 5;       // maximum allowable vertical gap // Global storage.
extern char* CdfFileName;       // cumulative distribution function
```

```
extern char* LexFileName;      // symbol lattice
extern double Pe;              // probability of bit error
extern double LogPe;           // log probability of bit error
extern double LogPc;           // log probability of bit correct
extern int HMinGap;            // minimum allowable horizontal gap
extern int HMaxGap;            // maximum allowable horizontal gap
extern int VMinGap;            // minimum allowable vertical gap
extern int VMaxGap;            // maximum allowable vertical gap
extern int Height;             // image height
extern int Width;              // image width
extern CDF Cdf;                // cumulative distribution function
extern int NAtoms;             // number of atoms
extern SYMB* *Lex;             // array of symbol lattices
extern RULE Rules[];           // production rules
extern RULE* RTab[NSYMBOLS][NSYMBOLS]; // pointers to productions // Global functions.
extern void InitGlob(int argc, char* argv[]);
extern CDF ReadCdf(char* CdfFileName, int* pHeight, int* pWidth);
extern SYMB** ReadLex(char* LexFileName, int* pNAtoms);
extern void Outward(SYMB* A, SYMB* B, SYMB** RD
EDIT S);
extern void Merge(SYMBRD
EDIT ** S);
extern void Parse(SYMB* s);
extern void Inward(SYMB* s);
extern void Count(SYMB* s, double& ce, double& cc);

#endif
/* DYNAMIC.H */
#ifndef dynamic_h
define dynamic_h include <iostream.h>
include <math.h> define PRECISION   16 /* bits in mantissa */
```

```
#define ONE        ( 1 << (PRECISION-1) )
define DYNRANGE   ( 1 << 31 ) /* range of exponent */ typedef unsigned short   MANTISSA;
typedef int              EXPONENT;
typedef unsigned long    LONGMANT;

class DYNAMIC {
    MANTISSA mantissa;
    EXPONENT exponent;
public:
    DYNAMIC();
    DYNAMIC(MANTISSA, EXPONENT);
    DYNAMIC(double);
    DYNAMIC operator+=(DYNAMIC);
    DYNAMIC operator*=(DYNAMIC);
    DYNAMIC operator/=(DYNAMIC);
    friend DYNAMIC operator+(DYNAMIC, DYNAMIC);
    friend DYNAMIC operator*(DYNAMIC, DYNAMIC);
    friend DYNAMIC operator/(DYNAMIC, DYNAMIC);
    friend int operator==(DYNAMIC, DYNAMIC);
    friend int operator!=(DYNAMIC, DYNAMIC);
    friend int operator>(DYNAMIC, DYNAMIC);
    friend int operator>=(DYNAMIC, DYNAMIC);
    friend int operator<(DYNAMIC, DYNAMIC);
    friend int operator<=(DYNAMIC, DYNAMIC);
    friend istream& operator>>(istream&, DYNAMIC&);
    friend ostream& operator<<(ostream&, DYNAMIC);
    friend DYNAMIC DYNexp(double);
};

#define  LOGe_2    0.69314718055994530941   /* log_e(2) */
#define  LOG2_e    1.44269504088896340737   /* log_2(e) */
#define  LOGe_10   2.30258509299404568401   /* log_e(10) */
#define  LOG10_e   0.43429448190325182765   /* log_10(e) */
#define  LOG10_2   0.30102999566398119521   /* log_10(2) */
```

```
inline double log2(double x) { return log(x) * LOG2_e; }
inline double log10(double x) { return log(x) * LOG10_e; }
inline double exp2(double x) { return exp(x * LOGe_2); }
inline double exp10(double x) { return exp(x * LOGe_10); } inline DYNAMIC::DYNAMIC()
{
    mantissa = exponent = 0;
} inline DYNAMIC::DYNAMIC(MANTISSA m, EXPONENT e)
{
    mantissa = m;
    exponent = e;
} inline DYNAMIC operator+(DYNAMIC a, DYNAMIC b)
{
    return a+=b;
}
inline DYNAMIC operator*(DYNAMIC a, DYNAMIC b)
{
    return a*=b;
} inline DYNAMIC operator/(DYNAMIC a, DYNAMIC b)
{
    return a/=b;
} inline int operator==(DYNAMIC a, DYNAMIC b)
{
    return (a.mantissa==b.mantissa && a.exponent==b.exponent);
} inline int operator!=(DYNAMIC a, DYNAMIC b)
{
```

```
    return (a.mantissa!=b.mantissa   a.exponent!=b.exponent);
} inline int operator>(DYNAMIC a, DYNAMIC b)
{
    if (a.mantissa == 0) a.exponent = DYNRANGE;
    if (b.mantissa == 0) b.exponent = DYNRANGE;
    return (a.exponent>b.exponent
        (a.exponent==b.exponent && a.mantissa>b.mantissa));
} inline int operator>=(DYNAMIC a, DYNAMIC b)
{
    if (a.mantissa == 0) a.exponent = DYNRANGE;
    if (b.mantissa == 0) b.exponent = DYNRANGE;
    return (a.exponent>b.exponent
        (a.exponent==b.exponent && a.mantissa>=b.mantissa));
} inline int operator<(DYNAMIC a, DYNAMIC b)

if (a.mantissa == 0) a.exponent = DYNRANGE;
    if (b.mantissa == 0) b.exponent = DYNRANGE;
    return (a.exponent<b.exponent
        (a.exponent==b.exponent && a.mantissa<b.mantissa));
} inline int operator<=(DYNAMIC a, DYNAMIC b)
{
    if (a.mantissa == 0) a.exponent = DYNRANGE;
    if (b.mantissa == 0) b.exponent = DYNRANGE;
    return (a.exponent<b.exponent
        (a.exponent==b.exponent && a.mantissa<=b.mantissa));
} inline DYNAMIC DYNexp(double loge_x)
{
```

```
    double log2_x = loge_x * LOG2_e;
    double flog2_x = floor(log2_x);
    return DYNAMIC(MANTISSA(exp2(log2_x-flog2_x)*ONE),
EXPONENT(flog2_x));
} endif
/* POPPUSH.H */
#include "rule.h"
include "symb.h"

/****************************************************************

NAME:   PopPush(from,to)

DESC:   Removes the first element from the list pointed to by *from
        and pushes it onto the list pointed to by *to.
        Updates *from and *to, and returns the updated *from.

BUGS:   Does not detect the error condition *from == 0.

****************************************************************/
inline SYMB* PopPush (          // SYMB version
    SYMB** from,
    SYMB** to
    ) { register SYMB* tmp = *to;
    *to = *from;
    *from = (*to)->next;
    (*to)->next = tmp;
    return (*from);
}

/****************************************************************

NAME:   Push(item,to)
```

DESC: Pushes item onto the list pointed to by *to. Updates *to.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*/

```c
inline void Push (            // RULE version
    RULE* item,
    RULE** to
    ) {
item->next = *to;
*to = item;
} inline void Push (            // SYMB version
    SYMB* item,
    SYMB** to
    ) {
item->next = *to;
*to = item;
} inline void Push (            // INTERP version
    INTERP* item,
    INTERP** to
    ) {
item->next = *to;
*to = item;
}
/* ERROR.H */
include <iostream.h> extern char VFRSION[];

extern "C" {
extern void exit(int status);
}
```

/\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

```
NAME:    Error(string)

DESC:    Writes string to cerr and exits.

CALLS:   exit(1)

***********************************************************************/
inline void Error (
    char* string,
    char* optstr = 0
) { cerr << VERSION << string << optstr << endl;
    exit(1);

}
```

I claim:

1. A method of identifying bitmapped objects of an image comprising the steps of:
    comparing the templates in an object template library with all areas of like size of the image,
    generating a set of signals for each such comparison that satisfies a defined matching criteria between the template and the image area being compared, said set of signals identifying the object based on the matching template, the location of the object in the image and an indication of the goodness of the match between the object and the template,
    forming a series of possible parse trees of the image with a probability of occurrence for each tree, wherein each parent node and its child nodes of each parse tree satisfies a grammatical production rule, in which certain ones of the production rules define spatial relationships between objects in the image, and
    selecting one of the possible parse trees having the largest probability of occurrence for further utilization.

2. The method of claim 1 further comprising the step of identifying a set of grammatical production rules before the step of forming the possible parse trees.

3. The method of claim 2 wherein the set of grammatical production rules define a context-free grammar.

4. The method of claim 1 or claim 3 wherein the parsing step further comprises:
    testing each object identified by each set of signals with each other such object, including the spatial constraints associated with the objects, to determine if the combination of such objects results in a new object that satisfies the production rules and, if so,
    calculating the probability of the existence of the combined object in the image, and
    including the new combined object and its probability as a possible parsing of the image.

5. The method of claim 4 wherein the probability of an object formed by combining objects a and b is calculated from the formula $$\text{outprob}(s) = \text{prob}(r) * \text{outprob}(a) * \text{outprob}(b) * \text{wsprob}(s),$$

where
    prob(r) is a probability associated with the production rule governing the combination of a and b,
    outprob(a) and outprob(b) are the probabilities of the existence of objects a and b in the image, as determined from a template, or outprob(s) and wsprob(s) is determined by the equation $$\text{wsprob}(s) = p^d (1-p)^{(k-d)},$$

where
    k is the area of apparent whitespace in a bounding box for the combined object s,
    d is the number of black pixels in this whitespace, and
    p is an empirically determined probability that one pixel in the image is in error.

6. The method of claim 1 further comprising the step of reestimating the probabilities associated with each production rule from the set of possible parse trees.

7. The method of claim 1 further comprising the step of reestimating the probability of a pixel error.

* * * * *